United States Patent [19]

Herder et al.

[11] Patent Number: 4,646,786
[45] Date of Patent: Mar. 3, 1987

[54] FLUID CONTROL VALVES WITH ANGLED METERING PORTS

[75] Inventors: Michael D. Herder; Howard J. Lambers, both of Kalamazoo, Mich.

[73] Assignee: Pneumo Corporation, Boston, Mass.

[21] Appl. No.: 788,568

[22] Filed: Oct. 17, 1985

[51] Int. Cl.⁴ ............................................. F15B 13/04
[52] U.S. Cl. ............................ 137/625.69; 137/625.3; 251/282
[58] Field of Search ..................... 137/625.3, 625.69; 251/282

[56] References Cited

U.S. PATENT DOCUMENTS

| 2,964,023 | 7/1957 | Meulendyk . | |
| 2,987,050 | 6/1961 | Oppenheimer | 137/625.69 X |
| 3,323,549 | 6/1967 | Carrington | 137/625.69 |
| 4,155,535 | 5/1979 | Seamone | 251/282 |

FOREIGN PATENT DOCUMENTS 981718 12/1982 U.S.S.R. .......................... 137/625.69

OTHER PUBLICATIONS

ASME Paper No. 56-A-121, dated Jul. 31, 1956, entitled "Compensation of Steady-State Flow Forces in Spool-Type Hydraulic Valves".

Primary Examiner—Gerald A. Michalsky
Attorney, Agent, or Firm—Renner, Otto, Boisselle & Lyon

[57] ABSTRACT

Flow control valve includes angled metering ports in the valve sleeve for directing the momentum of the fluid flow against the respective valve flow metering edges in a direction producing an opening reaction force on the valve upon initial valve opening in opposition to the usual axial flow forces tending to close the valve to reduce the flow force gain acting on the valve. Preferably, the angled metering ports are disposed at an angle of approximately 45° or greater from a line perpendicular to the valve axis. Also, a single set of circumferentially spaced angled metering ports is desirably provided for each return or high pressure flow path for producing the desired opening reaction force on the valve.

21 Claims, 6 Drawing Figures

COMPARISON OF ANGLE HOLE
TEST DATA VS NORMAL RECTANGULAR SLOTS

FLUID CONTROL VALVES WITH ANGLED METERING PORTS

BACKGROUND OF THE INVENTION

This invention relates generally as indicated to fluid control valves with angled metering ports and more particularly to such control valves in which the conventional valve flow force gains that normally occur upon opening of the valves are compensated for by utilizing angled metering ports in the valve sleeve which direct the return or high pressure fluid flow against the valve flow metering edges in a direction producing an opening reaction force in opposition to such conventional valve flow force gains.

It is well known that in spool-type valves with square edged lands, and in other types of sliding valves, steady-state forces substantially proportional to the flow rates through the valves are generated within the metering chambers and act on the moving members in a direction that tend to close the valves. Maintaining control over these axial closing forces is especially important, for example, in high performance valves where it is desirable to operate the valves throughout their entire operating range by means of relatively small control forces such as may be generated by direct drive force motors and the like.

Heretofore, various valves have been designed to compensate for such flow force gains. One such valve design is disclosed in U.S. Pat. No. 2,964,023, which is assigned to the same assignee as the present application. As shown, the valve spool of such patent is provided with two groups of small diameter inclined passages, one group of which is associated with each of the fluid return grooves. The inclined passages are arranged such that more passages are progressively moved into communication with the respective return grooves as the valve spool is moved to positions of greater displacement from the nuetral position. As disclosed, by progressively opening the small diameter passages, a de-centering force proportional to the centering force is provided. Such a valve construction has the drawback that the relative size and location of the passages must be carefully selected in order to obtain the desired de-centering force. The passages may either be formed in the valve spool or the valve sleeve to provide the desired fluid return flow path from the control ports to the reservoir return ports.

It is also known to provide a series of small radial holes arranged in a spiral around a valve sleeve on the supply side of the metering chamber to direct the high pressure fluid into such chamber at substantially 90° so that the flow forces developed on the valve spool are substantially reduced. Here again the relative size and location of the spiral holes must be carefully chosen on the basis of the required sensitivity of the valve. Moreover, with such an arrangement, there is no compensation of the valve centering force during the initial opening of the valve. Some compensation of the valve centering force has been obtained sooner by placing the first one or two holes in the valve sleeve at an angle of approximately 30° as measured from the valve axis so that the jet streams from these holes will impinge on a face of the valve causing an opening reaction force. However, this latter construction still does not provide for any reduction in the valve centering force during the initial opening of the valve.

Flow force compensation may also be obtained by providing negative flow force contours or recirculation lands on the valve spool return edge in series with the positive flow induced force on the pressure control edge. However, such recirculation lands provide very little compensation for conventional valve flow force gains during initial valve opening and low flows unless partial annular openings, for example, in the form of wedge cuts are provided on the flow metering edges in combination with shaped geometrical contours on the valve spool as disclosed, for example, in U.S. Pat. No. 4,155,535. In either case, the formation of these valve spool contours greatly increases the cost of manufacture of such valves.

SUMMARY OF THE INVENTION

In accordance with this invention, angled metering ports are provided in a valve sleeve surrounding the valve spool for directing the fluid medium against the valve spool flow metering edges in a direction producing an opening reaction force on the valve upon initial valve opening. This opening reaction force acts in opposition to the usual axial flow forces tending to close the valve to reduce the flow force gain acting on the valve.

Preferably, there is a single set of circumferentially spaced angled metering ports for each return or high pressure fluid flow path for controlling the momentum of the return or high pressure fluid flow upstream of the metering ports and directing such fluid flow at an angle against a flow metering edge on the valve in a direction producing a force tending to open the valve contrary to typical flow forces. The momentum of the fluid against the adjacent flow metering edge negates or overrides the typical high velocity/low pressure effects acting thereon and produces a valve opening force to compensate for the usual valve flow force gain.

To be effective in reducing the valve flow force gain upon initial valve opening, the angles metering ports should extend at an angle of approximately 45° or greater as measured from a line perpendicular to the valve axis.

To the accomplishment of the foregoing and related ends, the invention, then, comprises the feature hereinafter fully described and particularly pointed out in the claims, the following description and the annexed drawings setting forth in detail certain preferred embodiments of the invention, these being indicative, however, of but several of the various ways in which the principles of the invention may be employed.

DETAILED DESCRIPTION OF THE PREFERRED EMBODIMENTS

Figure 1:
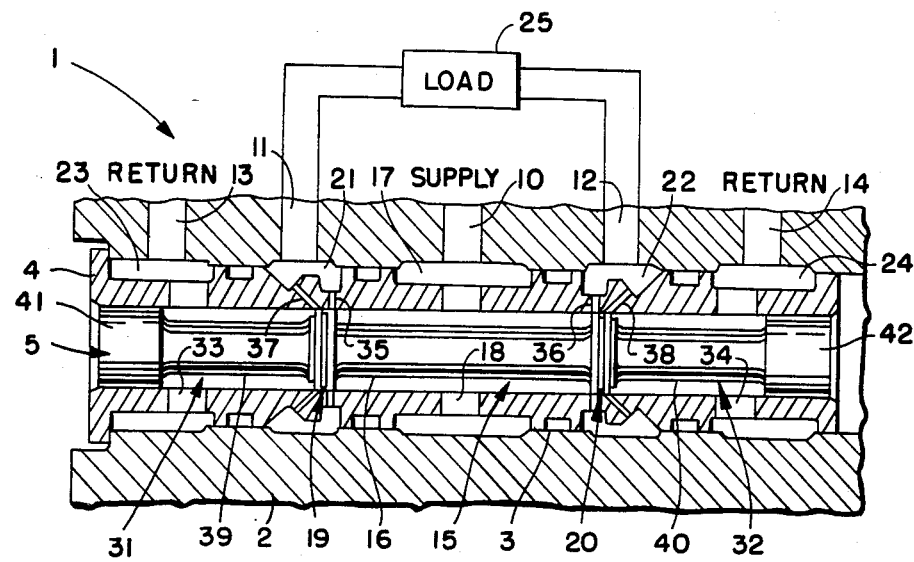
FIG. 1 is a fragmentary longitudinal section through a preferred form of flow control valve in accordance with this invention in which the valve member is shown in the neutral position.
Figure 2:
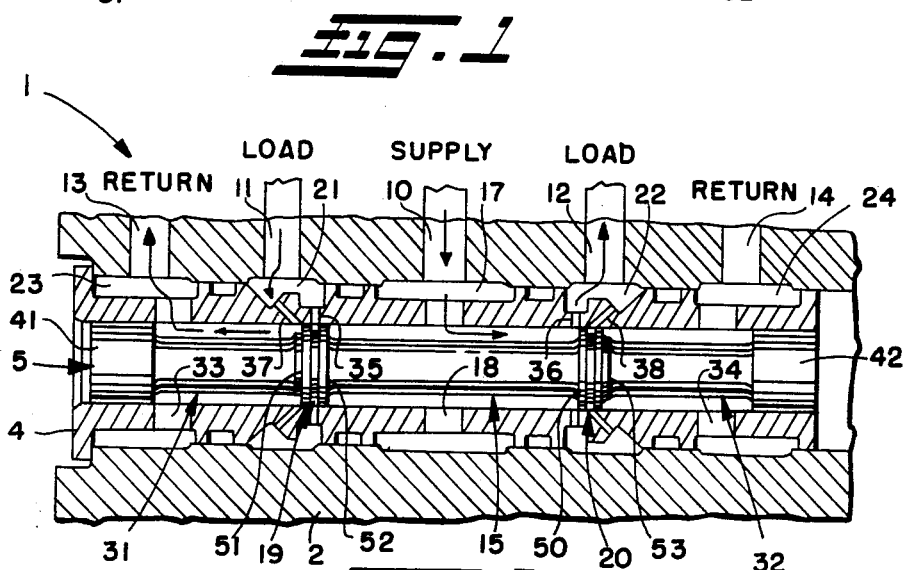
FIG. 2 is a fragmentary longitudinal section similar to FIG. 1 but showing the valve member in one of two operating positions for controlling the flow of fluid to and from a load.

Referring now in detail to the drawings, and initially to FIGS. 1 and 2, there is shown a preferred form of fluid control valve 1 in accordance with this invention including a valve housing 2 containing a longitudinal bore 3. Received in the bore 3 is a valve sleeve 4 which may be held against movement in any suitable manner. A valve spool or other movable valve member 5 is axially movable within the valve sleeve. The particular fluid control valve shown in a four-way valve the housing 2 of which includes a central pressure inlet port 10 and a pair of load ports 11, 12 and return ports 13, 14 on opposite sides of the inlet port. When the valve member 5 is a four land valve spool of the type shown in FIGS. 1 and 2, the inlet port 10 provides a continuous supply of high pressure fluid to a centrally located metering chamber 15 formed by the clearance space between the inner diameter of the valve sleeve 4 and an external groove 16 in the valve spool. The metering chamber 15 is always in communication with inlet port 10 for all positions of the valve spool through an external groove 17 in the valve sleeve and radial passages 18 extending therethrough. The opposite ends of the metering chamber 15 are bounded by a pair of space apart metering lands 19, 20 on the valve spool.

On opposite sides of the external groove 17 in the valve sleeve 4 are two pairs of external grooves 21, 22 and 23, 24, the first pair 21, 22 communicating with opposite ends of a load 25 such as a simple fluid motor through the load ports 11, 12 in the valve housing 2, and the second pair 23, 24 communicating with a fluid reservoir (not shown) through the return ports 13, 14 in the valve housing. The external grooves 23, 24 associated with the respective return ports 13, 14 communicate with respective additional metering chambers 31, 32 interiorly of the valve sleeve 4 through respective radial passages 33, 34 therein, whereas the external grooves 21, 22 associated with the load ports 11, 12 communicate both with the metering chamber 15 and metering chambers 31, 32 through respective sets of high pressure and return metering ports 35, 36 and 37, 38, respectively. Additional external grooves 39 and 40 in the valve spool 5 define the additional metering chambers 31 and 32 which may be bounded by one or the other of the lands 19 and 20 and two additional lands 41 and 42 on the valve spool.

The metering ports 35, 36 are intended to supply high pressure fluid from the high pressure metering chamber 15 to opposite ends of the fluid motor, whereas the metering ports 37, 38 are intended to provide for the return flow of fluid from such fluid motor. However, when the valve spool 5 is in the neutral or centered position shown in FIG. 1, the lands 19, 20 on the valve spool block fluid flow from the high pressure metering chamber 15 to both ends of the fluid motor through the metering ports 35, 36. Likewise, the same set of lands 19, 20 may be used to block the return flow of fluid from both ends of the fluid motor through the metering ports 37, 38.

To actuate the fluid motor (load) 25, a force may be applied to the valve spool 4 to move the valve spool in one direction or the other, for example, to the right as shown in FIG. 2, which causes high pressure fluid to flow from the metering chamber 15 past the flow metering edge 50 at the left end of the metering land 20 through the associated high pressure metering ports 36 to the right end of the fluid motor 25 and a return flow of fluid from the left end of the fluid motor through the associated return metering ports 37 past the flow metering edge 51 at the left end of metering land 19 into the metering chamber 31 which communicates with the valve housing return port 13 through the radial passages 33 and external groove 23 in the valve sleeve. Movement of the valve spool in the opposite direction causes a reverse flow of fluid from the metering chamber 15 past the metering edge 52 at the right end of the metering land 19 through the associated high pressure metering ports 35 to the left end of the fluid motor and a return flow of fluid from the right end of the fluid motor through the associated return metering ports 38 past the flow metering edge 53 at the right end of metering land 20 into the metering chamber 32 with communicates with the valve housing return port 14 through radial passages 34 and external groove 23 in the valve sleeve.

Figure 4:
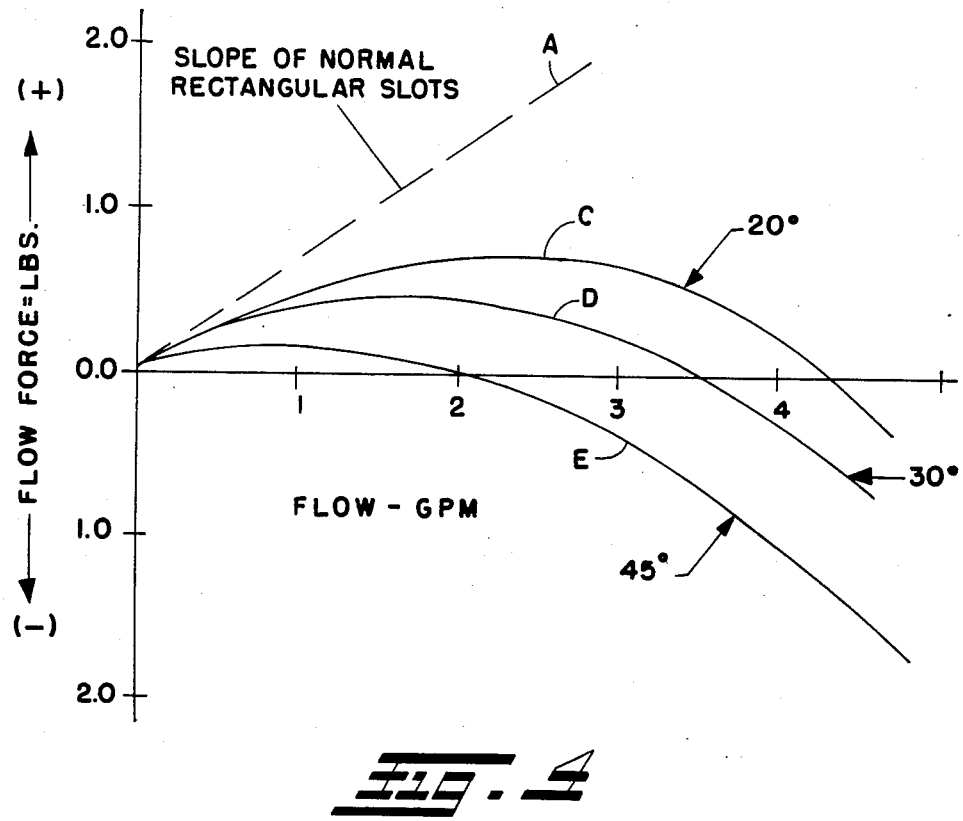
FIG. 4 is a graphic illustration comparing the valve opening force produced by the flow of the fluid medium through angled metering ports at different angles to the valve closing force produced by flow through conventional rectangular metering ports.

As is well known, in spool-type valves with square edged lands and in other types of sliding valves, when the fluid flows through a normal rectangular metering port (slot) such as shown at 35 and 36, a steady-state force substantially proportional to the flow rate through the valve is generated within the metering chamber 15 as schematically illustrated by the slope of line A in FIG. 4 which acts on the valve spool in a direction that tends to close the valve. This is true regardless of the angle of the metering ports when the high pressure fluid passes through the metering ports 35, 36 from the metering chamber 15 to the external load 25. Accordingly, the high pressure metering ports 35, 36 are desirably formed so that they extend radially through the valve sleeve 4 substantially at a 90° angle to the axis of the valve as shown in FIGS. 1 and 2.

Figure 3:
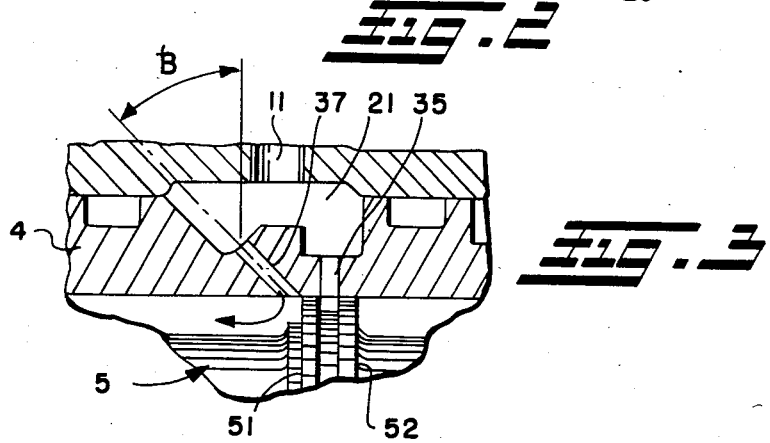
FIG. 3 is an enlarged fragmentary longitudinal section of one of the angled metering ports in the valve sleeve and an asociated valve spool flow metering edge of the flow control valve of FIG. 2 against which the fluid medium is directed for producing an opening reaction force on the valve upon initial valve opening.

Likewise, in the usual case, the high velocity stream of return flow from the load 25 passing through the return metering ports 37, 38 into the return metering chambers 31, 32 will normally produce a flow force acting on the valve spool in a direction tending to close the valve. However, it has been found that if the return flow metering ports 37, 38 for a four-way valve including a four land valve member 5 of the type shown in FIGS. 1 and 2 are angled in a direction sloping toward the associated flwo metering edges 51, 53 (i.e., toward the center of the valve as shown in FIGS. 1-3), the momentum of the fluid acting against the associated flow metering edges 51, 53 either negates or overrides the typical high velocity/low pressure effects and produces an opening force on the valve spool in opposition to the fluid flow generated closing force. As evident from the curves C, D and E of FIG. 4, the greater the angle B (see FIG. 3) of the return flow metering ports 37, 38 as measured from a line perpendicular to the valve axis, the lower the flow force slope. Moreover, as clearly shown by curves C, D and E of FIG. 4, metering port angles up to 30° have relatively minor effect, whereas metering port angles of 45° or greater have a considerable slope reduction which makes them effective in reducing the valve flow force gain upon initial valve opening.

From the foregoing, it will be seen that the reduced flow force gain resulting from the valve construction shown in the FIGS. 1 and 2 embodiment is accomplished by making use of the fluid momentum of the return flow upstream of the valve sleeve which is directed against the associated flow metering edges 51, 53 by using the simple technique of manufacturing the valve sleeve return flow metering ports 37, 38 at an angle to the valve axis rather than perpendicular thereto. The angled return flow metering ports provide lower flow force spring rates for the valve member which when placed in series with the conventional supply flow metering ports (slots) results in reduced power requirements or increased performance, thereby permitting high performance valves to be operated throughout their entire operating range by means of relatively small control forces such as may be generated by direct drive force motors and the like. As shown, there is only one set of circumferentially spaced radial high pressure metering ports 35 or 36 for each high pressure flow path, and only one set of circumferentially spaced angled return flow metering ports 37 or 38 for each return flow path, which are sized to carry the displaced return flow back to the reservoir and positioned to open at the same rate as the high pressure metering ports which control the flow of high pressure fluid to the opposite ends of the load. Moreover, the angle of all of the return flow metering ports is desirably such that they are effective in reducing the valve flow force gain throughout the entire operating range of the valve including the initial valve opening.

Figure 5:
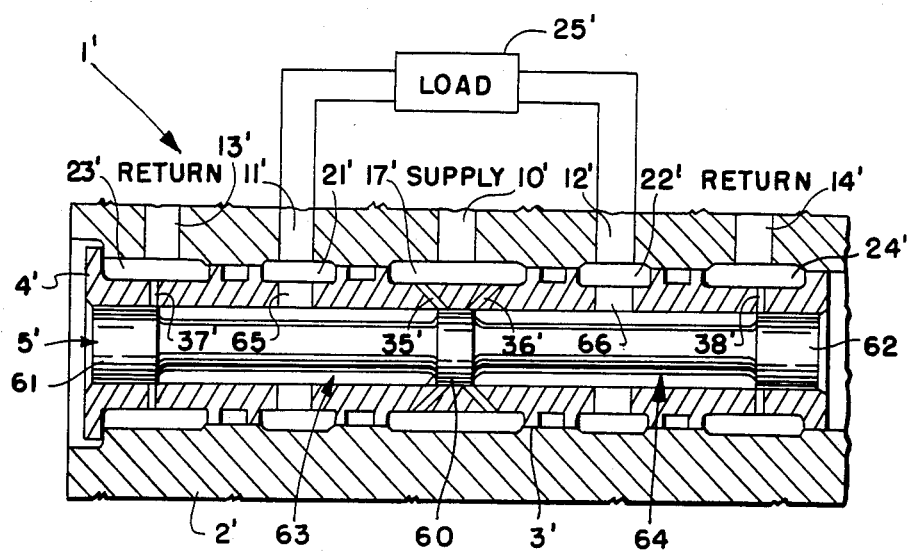
FIG. 5 is a fragmentary longitudinal section through another form of flow control valve in accordance with this invention in which the valve member is shown in the neutral position.
Figure 6:
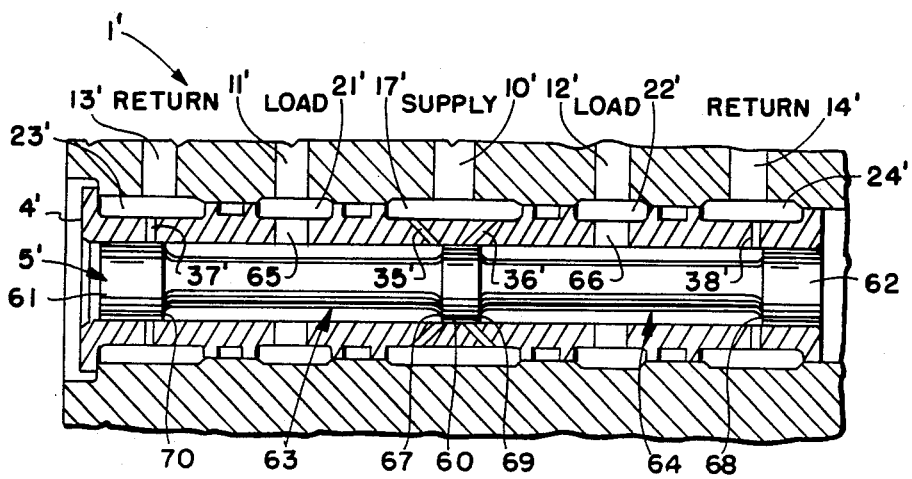
FIG. 6 is a fragmentary longitudinal section similar to FIG. 5 but showing the valve member in one of two operating positions for controlling the flow of fluid to and from a load.

In FIGS. 5 and 6 there is shown another form of fluid control valve 1' in accordance with this invention which is similar in many respects to the fluid control valve 1 previously described. Accordingly, the same reference numerals followed by a prime symbol are used to designate like parts. However, the control valve 1' differs in that the differs in that the valve member 5' only has three spaced apart lands 60, 61 and 62 rather than four, and there are only two metering chambers 63, 64 rather than three as in the FIGS. 1 and 2 embodiment.

Also in the FIGS. 5 and 6 embodiment, the load ports 11', 12' are always in communication with the respective metering chambers 63, 64 through associated radial passages 65, 66 in the valve sleeve 4' which communicate with the respective external grooves 21', 22' in the valve sleeve. Moreover, the respective sets of high pressure metering ports 35', 36' through which high pressure fluid passes communicate directly with the high pressure groove 17' in the valve sleeve 4', and the respective sets of return metering ports 37', 38' communicate directly with the respective external return grooves 23', 24' in the valve sleeve.

When the valve spool 5' is in the neutral or centered position shown in FIG. 5, the center metering land 60 blocks the flow of high pressure fluid from the pressure inlet port 10' through both sets of high pressure metering ports 35', 36'. Likewise, the end lands 61, 62 block the respective return flow metering ports 37', 38'.

To actuate the fluid load 25', a force may be applied to the valve spool 5' to move the valve spool in the same manner as in the FIGS. 1 and 2 embodiment, for example, to the right as shown in FIG. 6, which causes high pressure fluid to flow through the set of high pressure metering ports 35' past the flow metering edge 67 at the left end of the center metering land 60 to the left end of the fluid motor 25' through metering chamber 63, radial passages 65, external groove 21' and load port 11' and a return flow of fluid from the right end of the fluid motor through the load port 12', external groove 22', radial passages 66, metering chamber 64 and the associated set of return metering ports 38' past the flow metering edge 68 at the left end of end metering land 62. During such movement, the other set of high pressure metering ports 36' and return flow metering ports 37' remain blocked by the respective metering lands 60, 61.

Movement of the valve spool in the opposite direction causes a reverse flow of fluid through the other set of high pressure metering ports 36' past the flow metering edge 69 at the right end of the center metering land 60 to the right end of the fluid motor and a return flow of fluid from the left end of the fluid motor through the associated set of return metering ports 37' past the flow metering edge 70 at the right end of the other end metering land 61. During such movement of the valve spool to the left, the set of high pressure metering ports 35' and return metering ports 38' will be blocked by the respective metering lands 60, 62.

In this particular embodiment, it is the respective sets of high pressure metering ports 35', 36' rather than the return meterin ports 37', 38' that are angled in a direction sloping toward the respective flow metering edges 67, 69 of the center land 60 (i.e., toward the center of the valve as shown in FIGS. 5 and 6) whereby the momentum of the high pressure fluid passing through the respective sets of high pressure metering ports 35', 36' acts against the associated flow metering edges 67, 69 to either negate or override the typical high velocity/low pressure effect and produce an opening force on the valve spool in opposition to the fluid flow generated closing force resulting from the return flow passing through the return metering ports 37', 38' into the respective metering chambers 63, 65. In this case the respective sets of return flow metering ports 37', 38' are desirably formed so that they extend radially through the valve sleeve 4' substantially at a 90° angle to the axis of the valve 1' as further shown in FIGS. 5 and 6. Otherwise, the details of construction and operation of the fluid control valve 1' are substantially the same as the fluid control valve 1 of the FIGS. 1 and 2 embodiment.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A valve comprising a valve housing containing a pressure supply port and load and return ports, a plurality of metering chambers, first metering means for controlling the rate of high pressure fluid flow from said pressure supply port to a load port through one of said metering chambers, second metering means for controlling the rate of return flow from another of said load ports to a return port through another of said metering chambers, and valve means movable between a neutral position blocking the flow of fluid through said first and second metering means to an open positin permitting such fluid flow, said valve means including valve metering edges which control the amount of fluid flow through said first and second metering means during such opening movement of said valve means, one of said metering means consisting of a plurality of angled metering ports all in radially aligned, circumferentially spaced relation to each other having full pressure drop thereacross for directing the momentum of the fluid flowing therethrough at an angle against the associated valve metering edge at all times including during the initial opening movement of said valve means from such neutral position to produce a force acting on said valve means urging said valve means toward such open position.

2. The valve of claim 1 wherein said first metering means comprises said one metering means which direct the momentum of the high pressure flow from said supply port at an angle against the associated valve metering edge to produce a force acting on said valve means urging said valve means toward such operating position.

3. The valve of claim 1 wherein said second metering means comprises said one metering means which direct the momentum of the return flow from one of said load ports at an angle against the associated valve metering edge to produce a force acting on said valve means urging said valve means toward such operating position.

4. The valve of claim 1 wherein said angled metering ports extend at an angle of approximately 45° toward the associated valve metering edge as measured from a line perpendicular to the axis of said valve.

5. The valve of claim 1 wherein said angled metering ports extend at an angle greater than 45° toward the associated valve metering edge as measured from a line perpendicular to the axis of said valve.

6. The valve of claim 1 further comprising a valve sleeve surrounding said valve means, said valve sleeve containing said first and second metering means, a valve spool axially movable within said valve sleeve between such neutral and open positions, said valve spool including land means for blocking the flow of fluid respectively from and to said metering chambers when said valve spool is in the neutral position and permitting such flow when said valve spool is in an open position, said land means including edges defining said valve metering edges, said aangled metering ports extending through said valve sleeve at an angle toward the respective valve metering edge on said valve land means.

7. A valve comprising a valve housing containing a pressure supply port and load and return ports, a first metering chamber for receiving high pressure fluid from said pressure supply port, first metering means for controlling the rate of flow from said first metering chamber to a load port, a second metering chamber in communication with a return port, second metering means for controlling the rate of return flow from a load port to said second metering chamber, and valve means movable between a neutral position blocking the flow of fluid through said first and second metering means to an open position permitting such fluid flow, said valve means including valve metering edges which control the amount of fluid flow through said first and second metering means during movement of said valve means to an open position, said second metering means consisting of a plurality of angled return flow metering ports all in radially aligned, circumferentially spaced relation to each other having full pressure drop thereacross for directing the momentum of such return flow against the associated valve metering edge at all times during opening movement of said valve means to produce a force acting on said valve means urging said valve means toward such open position.

8. The valve of claim 7 wherein said angled return flow metering ports extend at an angle of approximately 45° toward the associated valve metering edge as measured from a line perpendicular to the axis of said valve.

9. The valve of claim 7 wherein said angled metering ports extend at an angle greater than 45° toward the associated valve metering edge as measured from a line perpendicular to the axis of said valve.

10. The valve of claim 7 wherein said first metering means comprises a plurality of radially aligned circumferentially spaced high pressure metering ports associated with said first metering chamber extending substantially perpendicular to the axis of said valve.

11. The valve of claim 7 wherein said valve means includes a valve land having an edge defining said valve metering edge for said second metering means.

12. The valve of claim 7 further comprising a valve sleeve surrounding said valve means, said valve sleeve containing said first and second metering means, said valve means comprising a valve spool axially movable within said valve sleeve between such neutral and operating positions, said valve spool including land means for blocking the flow of fluid respectively from and to saaid first and second metering chambers when said valve spool is in the neutral position and permitting such flow when said valve spool is in an open position, said land means including opposite edges defining said valve metering edges.

13. The valve of claim 7 wherein said valve means is contained in a bore in said housing, said valve means comprising a valve spool having a plurality of spaced apart lands and grooves defining with the wall of said bore said first and second metering chambers, said valve spool having additional spaced apart lands and grooves which define with the wall of said bore a third metering chamber in communication with a second return port, and third metering means for controlling the rate of return flow from such load to said third metering chamber, said valve means being movable off such neutral position to permit high pressure flow from said first metering chamber to one of two load ports and permitting return flow from the other of said load ports to one or the other of said second and third metering chambers.

14. A fluid control valve comprising a valve housing, a valve sleeve contained in a bore in said housing, and a valve spool movable within said valve sleeve, said valve spool including a plurality of lands and grooves defining with the wall of said bore a first metering chamber in communication with a fluid supply and second and third metering chambers on opposite sides of said first metering chamber in comunication with a return, said valve sleeve having first and second sets of high pressure metering ports associated with said first metering chamber and a single set of fluid return metering ports associated with each of said second and third metering chambers, said first and second sets of high pressure metering ports being in communication with a pair of spaced apart load ports in said housing, and each of said sets of return flow metering ports being in communication with one or the other of said load ports, said valve spool being movable between a neutral position blocking the flow of fluid from said first metering chamber through both sets of high pressure metering ports to both load ports and blocking the return flow from both load ports through both of said sets of return flow metering ports to said second and third metering chambers, and an open position in either direction from such neutral position to permit metered high pressure flow to one or the other of said load ports through one or the other of said sets of high pressure metering ports and permitting metered return flow from the opposite load port through one or the other sets of return flow metering ports to one or the other of said second and third metering chambers, said valve spool including valve metering edges which control the amount of fluid flow through each set of said high pressure and return flow metering ports, all of said return flow metering ports of each set being in radially aligned, circumferentially spaced relation to each other and disposed at an angle relative to the respective valve metering edges having full pressure drop thereacross for directing the momentum of such return flow against said valve metering edges at all times during opening movement of said valve spool to produce a force acting on said valve spool urging said valve spool toward one or the other of said open positions.

15. The valve of claim 14 wherein all of said return flow metering ports of each set extend at an angle of approximately 45° toward the respective flow metering edges as measured from a line perpendicular to the axis of said valve.

16. The valve of claim 14 wherein said return flow metering ports of each set extend at an angle greater than 45° toward the respective valve metering edges as measured from a line perpendicular to the axis of said valve.

17. The valve of claim 14 wherein the same land that blocks the flow of fluid from said first metering chamber through one of said sets of high pressure metering ports when valve spool is in the neutral position also blocks the return flow of fluid through one of said sets of return flow metering ports, and the opposite ends of said land form said flow metering edges for the respective sets of high pressure metering ports and return flow metering ports.

18. A valve comprising a valve housing containing a pressure supply port and load and return ports, a pair of metering chambers in communication with respective load ports, first metering means for controlling the rate of flow from said pressure supply port to one of said metering chambers, second metering means for controlling the rate of flow from the other of said metering chambers to a return port, and valve means movable between a neutral position blocking the flow of fluid through said first and second metering means to an open position permitting such fluid flow, said valve means including valve metering edges which control the amount of fluid flow through said first and second metering means during movement of said valve means to such open position, said first metering means consisting of a plurality of angled high pressure metering ports all in radially aligned, circumferentially spaced relation to each other having full pressure drop thereacross for directing the momentum of the high pressure flow against the associated valve metering edge at all times during opening movement of said valve means including during the initial opening movement of said valve means from said neutral position to produce a force acting on said valve means urging said valve means toward such open position.

19. The valve of claim 18 further comprising third metering means for controlling the rate of flow from said pressure supply port to the other of said metering chambers, and fourth metering means for controlling the rate of flow from said one metering chamber to a return port, said valve means also including valve metering edges which control the amount of fluid flow through said third and fourth metering means during movement of said valve means to another open position, said third metering means also consisting of a plurality of angled high pressure metering ports all in radially aligned, circumferentially spaced relation to each other having full pressure drop thereacross for directing the momentum of the high pressure flow passing through said third metering means against the associated valve metering edge at all times during opening movement of said valve means to such another open position to produce a force acting on said valve means urging said valve means toward such another open position.

20. The valve of claim 18 wherein said angled high pressure metering ports extend at an angle of approximately 45° toward the associated valve metering edge as measured from a line perpendicular to the axis of said valve.

21. The valve of claim 18 wherein said angled high pressure metering ports extend at an angle greater than approximately 45° toward the associated valve metering edge as measured from a line perpendicular to the axis of said valve.

* * * * *